No. 856,883. PATENTED JUNE 11, 1907.
J. M. KELLOGG.
ANIMAL TRAP.
APPLICATION FILED APR. 23, 1906.

3 SHEETS—SHEET 1.

WITNESSES
INVENTOR
James M. Kellogg
BY Munn & Co
ATTORNEYS

No. 856,883. PATENTED JUNE 11, 1907.
J. M. KELLOGG.
ANIMAL TRAP.
APPLICATION FILED APR. 23, 1906.

3 SHEETS—SHEET 2.

WITNESSES

INVENTOR
James M. Kellogg
BY Munn & Co.
ATTORNEYS

No. 856,883. PATENTED JUNE 11, 1907.
J. M. KELLOGG.
ANIMAL TRAP.
APPLICATION FILED APR. 23, 1906.
3 SHEETS—SHEET 3.
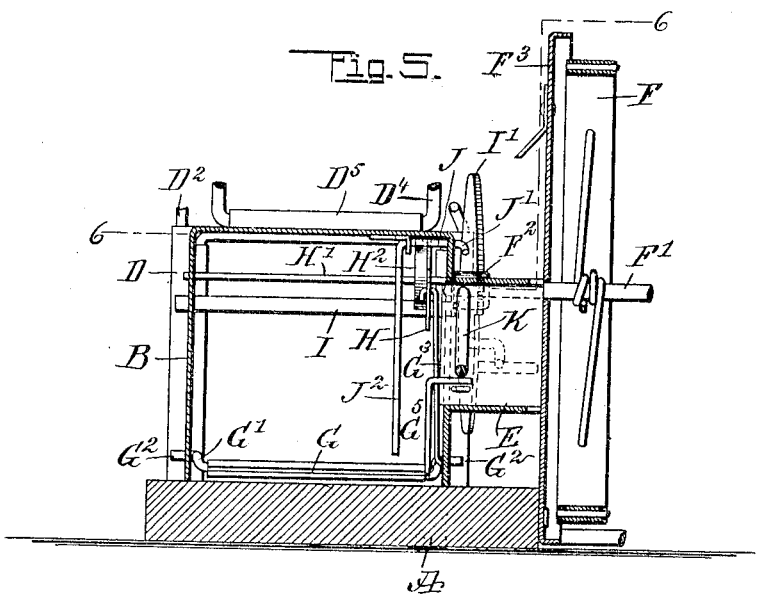
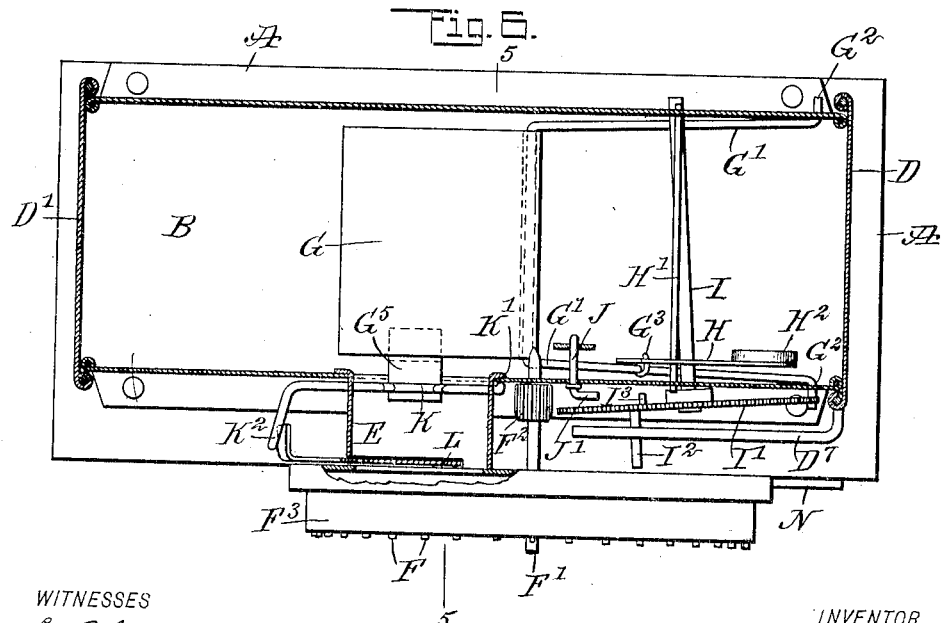
WITNESSES
INVENTOR
James M. Kellogg
BY
ATTORNEYS

UNITED STATES PATENT OFFICE.

JAMES MOSLEY KELLOGG, OF BOZEMAN, MONTANA.

ANIMAL-TRAP.

No. 856,883.  Specification of Letters Patent.  Patented June 11, 1907.

Application filed April 23, 1906. Serial No. 313,181.

*To all whom it may concern:*

Be it known that I, JAMES MOSLEY KELLOGG, a citizen of the United States, and a resident of Bozeman, in the county of Gallatin and State of Montana, have invented a new and Improved Animal-Trap, of which the following is a full, clear, and exact description.

The invention relates to animal traps, such as shown and described in Letters Patent of the United States, No. 578,244, granted to me March 2, 1897.

The object of the present invention is to provide a new and improved animal trap more especially designed for catching small animals, such as mice, rats, rabbits, etc., and successively in large numbers, each caught animal resetting the trap for the next animal.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all views.

Figure 1:
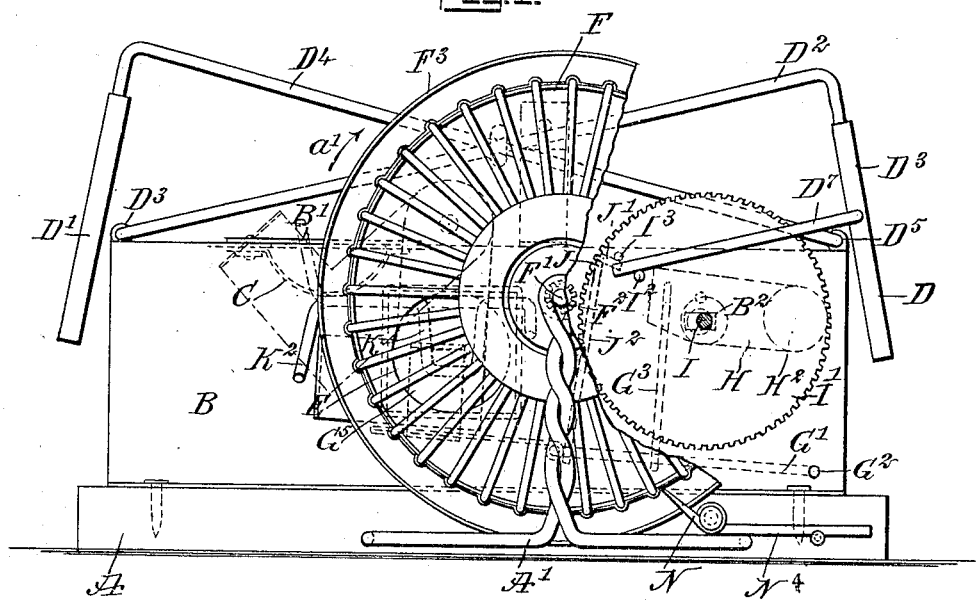
Figure 2:
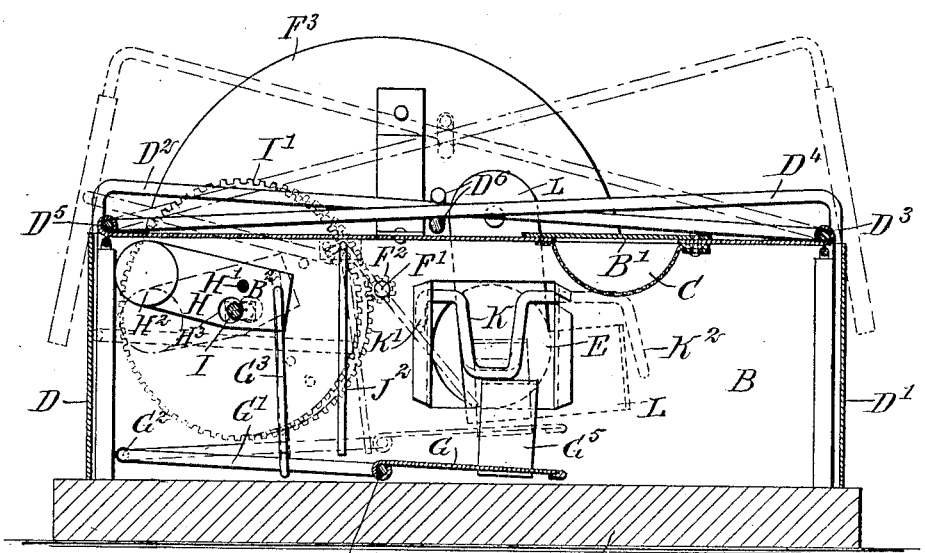
Figure 3:
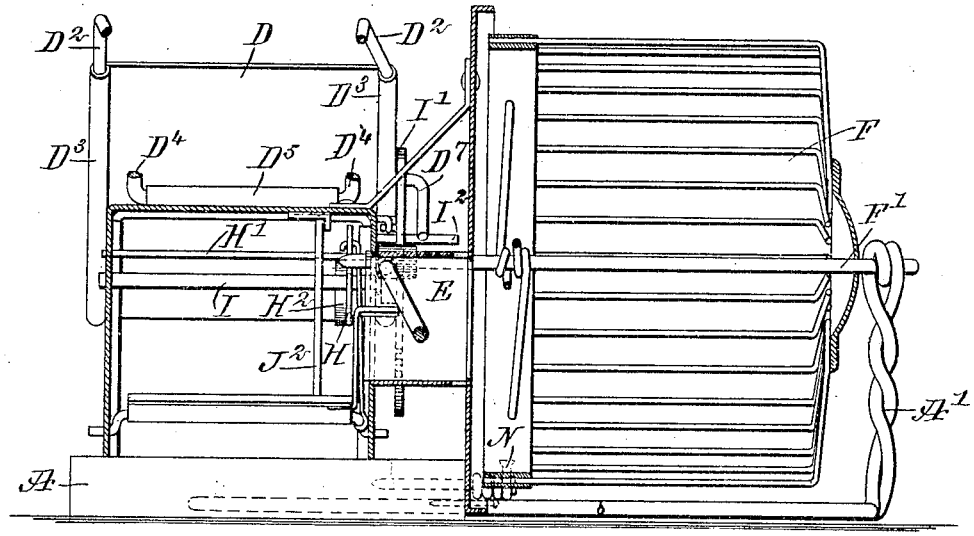
Figure 4:
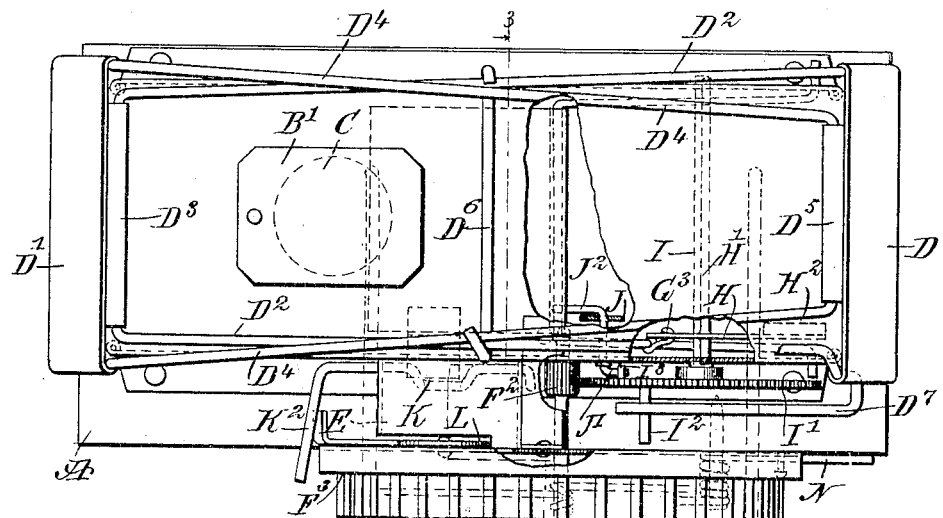
Figure 4:
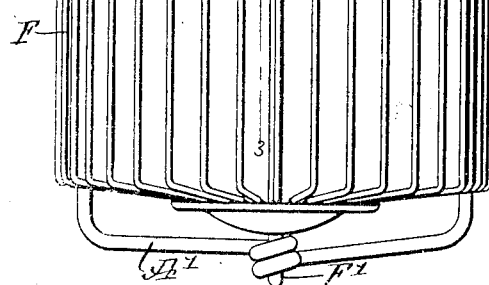

Figure 1 is a front side elevation of the improvement showing the trap open; Fig. 2 is a rear sectional side elevation of the same showing the trap closed; Fig. 3 is a cross section of the same on the line 3—3 of Fig. 4; Fig. 4 is a plan view of the same, parts being broken away; Fig. 5 is a cross section of the improvement showing the trap closed, a section being on the line 5—5 of Fig. 6, and Fig. 6 is a sectional plan view of the same on the line 6—6 of Fig. 5.

On a suitably constructed base A is mounted an entrance chamber B containing in its top a bait cage C to which access is had from the top of the chamber by a suitable door B', as plainly indicated in Figs. 1, 2 and 4. The ends of the chamber B are open when the trap is set, and the said ends are adapted to be closed by doors, D D', of which the door D is provided at its upper end with longitudinally extending arms $D^2$ fulcrumed at $D^3$ on the top of the chamber B near the door D'. The latter is provided with longitudinally extending arms $D^4$ fulcrumed at $D^5$ on the top of the chamber B near the door D, so that the two arms $D^2$ and $D^4$ cross each other at or near their middle, and the arms $D^2$ are provided with a cross bar $D^6$, on which rest the other arms $D^4$, so that when one door is moved up or down the other door will move in the same direction by the action of the cross bar $D^6$.

The inside of the chamber B is connected by a gangway or tube E with the inner open end of a revoluble cage F arranged on the front side of the chamber B, and having its shaft F' journaled at the outer end in a bearing A' attached to the base A, and the inner end of the said shaft being journaled in the front side of the chamber B. Within the chamber B is arranged a platform G having longitudinally extending arms G', fulcrumed at $G^2$ in the front and rear sides of the chamber B near the door D, to allow the platform G to swing up and down, the platform being preferably arranged in front of the gangway or tube E, see Fig. 6. One of the arms G' of the platform G is connected by a link $G^3$ with an arm H secured on a shaft H', journaled in the sides of the chamber B, and on the said arm H is secured a weight $H^2$ for overbalancing the platform G to normally swing the platform into a raised or uppermost position. Through an aperture $H^3$ in the arm H extends transversely a shaft I, loosely journaled at one end in the rear side of the chamber B and extending through an elongated slot $B^2$ formed in the front side of the chamber B.

On the outer end of the shaft I is secured a gear wheel I', adapted to mesh with a pinion $F^2$ secured on the shaft F' of the revoluble cage F, so that when an animal has passed into the revoluble cage F and rotates the same then the pinion $F^2$ rotates the gear wheel I'. Now, on the outer face of the gear wheel I', is secured a crank arm $I^2$, adapted to engage an arm $D^7$ projecting longitudinally from the door D, and hence when the gear wheel I' is rotated, and the crank arm $I^2$ engages the arm $D^7$, then the door D is lifted and with it the door D', as previously explained.

On the inner face of the gear wheel I' is secured a stop pin $i^3$, adapted to rest against an arm J' on a shaft J, journaled in the front side of the chamber B and extending to the inside thereof, and from the inner end of the shaft J depends an arm $J^2$ resting with its lower end against the inner end $G^4$ of the platform G at the time the latter is in a raised position so that the arm J' cannot turn so long as the platform is in a raised position. Now when the stop $I^3$ engages the arm J', the gear wheel is stopped and prevented from turning by said stop and arm, and as the cage continues to be revolved by the animal, the gear wheel, as it cannot turn, will be moved by the pinion F out of mesh with said pinion, thereby permitting the cage to revolve freely at the time the doors are raised or in a set position. It is to be understood that this movement of the gear wheel is very slight, just sufficient to move it out of mesh with the pinion, and not enough to swing the lever H to cause it to lower the platform.

Into the gangway or tube E projects a tripping arm K, preferably in the form of a crank arm journaled in the sides of the said gangway and resting against an angular arm G⁵ attached to the platform G, as long as the latter is raised. The tripping arm K stands in an inclined position while the trap is set, and when an animal steps on the platform G and the latter descends, then the arm G⁵ releases the arm K and the latter swings into a vertical position and on top of the arm G⁵, to lock the platform G in a lowermost position for the time being. One end of the tripping arm K is provided with an angular arm K′ adapted to rest against the outer face of the front side of the chamber B. The other end of the tripping arm K is provided with an angular arm K² engaging one side of a swing gate L pivoted on the fixed head F³ of the cage F. The swing gate L partly closes the gangway or tube E adjacent to the fixed head F³ and serves to prevent return movement of the animal from the cage F.

The revoluble cage F is designed to rotate in the direction of the arrow a′ only, and the return movement thereof is prevented by a suitable dog N (see Fig. 1), and arranged to engage the inner peripheral surface of the cage F adjacent to the fixed head F³ of the cage, and which head F³ is attached to the base A and has an opening registering with the gangway or tube E.

The operation is as follows: When the animal trap is set the doors D, D′ are held in a raised position by the action of the crank arm I² of the gear wheel I′, having its stop pin I³ abutting against the stop arm J′, held against movement by its arm J² abutting against the inner end G⁴ of the raised platform G. Now, when an animal passes into the chamber B and steps on to the platform G, then the weight of the animal overbalances the weighted arm H, so that the platform G swings downward and in doing so the link G³ imparts a swinging motion to the weighted arm H, which now swings the shaft I into an angular position, so that the gear wheel I′ assumes an angular position (see Fig. 6) and thus moves out of mesh with the pinion F². As soon as the platform G swings downward it releases the arm J² of the stop arm J′, so that the gear wheel I′ is now free to rotate owing to the pressure exerted against the crank arm I² by the arm D⁷ of the door D. The doors D, D′ now swing downward and close, and the animal confined in the chamber B now passes into the gangway or tube E and from the latter into the cage F to rotate the same in the direction of the arrow a′. The platform G in swinging downward carries the arm G⁵ in a like direction, so that the tripping arm K which rests against the outer edge of the arm G⁵ now swings on to the top of the same (see Fig. 5) to lock the platform G in a lowermost position for the time being. The animal during its passage from the chamber B through the gangway or tube E into the cage F imparts an upward swinging movement to the tripping arm K, so that the arm K² thereof swings out of engagement with the gate L and the animal in now putting its snout against the inner end of the partly closed gate L, swings the latter completely open to allow the animal to pass into the cage F. As the gate L swings open it engages the arm K² and holds the tripping arm K in a raised position, and when the animal has passed into the cage, the gate L swings back to its normal position, thus allowing the tripping arm K to return to normal position. The tripping arm K in swinging upward as before stated, moves out of contact with the arm G⁵, thus unlocking the platform G, which by the weighted arm H is immediately returned to its raised position. The platform in returning to the raised position, returns the shaft I and the gear wheel I′ to normal position, that is, the gear wheel I′ moves back into mesh with the pinion F².

From the foregoing it will be seen that an animal in passing from the entrance chamber B into the cage F, causes an unlocking of the platform G to allow the latter to return to its normal uppermost position, and to cause the tripping arm K to lock the gate L against opening, thus hindering the animal from returning through the tube or gangway E back into the chamber B while the doors D, D′ are open.

Having thus described my invention, I claim as new and desire to secure by Letters Patent:

1. An animal trap comprising a revoluble cage, an entrance chamber connected with the said cage, a door for closing the entrance to the said chamber, means for opening the door on turning the said cage and a releasing device for the said door.

2. An animal trap comprising a revoluble cage, an entrance chamber connected with the said cage, a door for closing the entrance to the said chamber, means for opening the door on turning the said cage, a movable platform in the said chamber, and a releasing device for the said door and controlled by the said platform.

3. An animal trap comprising a revoluble cage, an entrance chamber connected with the said cage, a door for closing the entrance to the said chamber, a pinion on the shaft of the said revoluble cage, a shaft, a gear wheel on the shaft and adapted to mesh with the said pinion, said gear wheel having a crank arm adapted to engage the said door to raise the same, and a platform movable in the said chamber and having a counterweight for moving the said platform into a raised position, the shaft of the said gear wheel being connected with the said platform to move the said gear wheel into meshing position with the said pinion on raising the platform and to move the said gear wheel out of meshing position on lowering the platform.

4. An animal trap comprising a revoluble cage, an entrance chamber connected with the said cage, a door for closing the entrance to the said chamber, a pinion on the shaft of the said revoluble cage, a gear wheel adapted to mesh with the said pinion and having a crank arm adapted to engage the said door to raise the same, a platform movable in the said chamber and having a counterweight for moving the said platform into a raised position, the shaft of the said gear wheel being connected with the said platform to move the said gear wheel in meshing position with the said pinion on raising the platform and to move the said gear wheel out of meshing position on lowering the platform, and a stopping device for the said gear wheel and controlled by the platform.

5. An animal trap comprising a revoluble cage, an entrance chamber connected with the said cage, a door for closing the entrance to the said chamber, a pinion on the shaft of the said revoluble cage, a gear wheel adapted to mesh with the said pinion and having a crank arm adapted to engage the said door to raise the same, a platform movable in the said chamber and having a counterweight for moving the said platform into a raised position, the shaft of the said gear wheel being connected with the said platform to move the said gear wheel in meshing position with the said pinion on raising the platform and to move the said gear wheel out of meshing position on lowering the platform, and a swing gate in the connection between the said entrance chamber and the said revoluble cage.

6. An animal trap comprising a revoluble cage, an entrance chamber connected with the said cage, a door for closing the entrance to the said chamber, a pinion on the shaft of the said revoluble cage, a gear wheel adapted to mesh with the said pinion and having a crank arm adapted to engage the said door to raise the same, a platform movable in the said chamber and having a counterweight for moving the said platform into a raised position, the shaft of the said gear wheel being connected with the said platform to move the said gear wheel in meshing position with the said pinion on raising the platform and to move the said gear wheel out of meshing position on lowering the platform, a swing gate in the connection between the said entrance chamber and the said revoluble cage, and a tripping arm in the said connection and adapted to lock the said platform temporarily in a lowermost position and to lock the swing gate against opening.

7. An animal trap comprising a revoluble cage, an entrance chamber connected with the said cage, a door for closing the entrance to the said chamber, a pinion on the shaft of the said revoluble cage, a gear wheel adapted to mesh with the said pinion and having a crank arm adapted to engage the said door to raise the same, a platform movable in the said chamber and having a counter-weight for moving the said platform into a raised position, the shaft of the said gear wheel being connected with the said platform to move the said gear wheel in meshing position with the said pinion on raising the platform and to move the said gear wheel out of meshing position on lowering the platform, a swing gate in the connection between the said entrance chamber and the said revoluble cage, and a tripping arm in the said connection for locking and releasing the said gate.

8. An animal trap comprising a revoluble cage, an entrance chamber, a gangway connecting the entrance chamber with the said cage, a movable platform in the said entrance chamber, a swing gate in the said gangway adjacent to the cage, and a tripping arm in the gangway adjacent to the entrance chamber, the tripping arm serving to lock the platform in a lowermost position and to lock and release the said gate.

9. In an animal trap, a revoluble cage, an entrance chamber having communication with the cage, means controlling admission to the entrance chamber, and means whereby the admission controlling means is operated by the revolution of the cage.

10. In an animal trap, a revoluble cage, an entrance chamber having communication with the cage, a door for the entrance chamber, and means whereby the door is opened by the revolution of the cage.

11. In an animal trap, a revoluble cage, an entrance chamber having communication with the cage, a door for the entrance chamber, means for operating the door from the cage, a platform in the entrance chamber, and means for controlling the door operating means from the platform.

12. In an animal trap, a revoluble cage, an entrance chamber having communication with the cage, a door for the entrance chamber, a shaft mounted in the entrance chamber, means for operating the shaft from the cage, means for operating the door from said shaft, a platform in the entrance chamber, and means for controlling the shaft operating means from the platform.

13. In an animal trap, a revoluble cage, a shaft upon which the cage is mounted, an en trance chamber having communication with the cage, a door for the entrance chamber, a shaft mounted in the entrance chamber, gearing for operating the shaft from the cage shaft, means for operating the door from the said gearing, a platform in the entrance chamber, and means for throwing the said gearing out of mesh from the platform.

14. In an animal trap, a cage, an entrance chamber, a tilting platform in the entrance chamber, a passage connecting the cage and entrance chamber, a gate for said passage, and a tripping arm in the passage and serving to lock and release the gate and to lock the platform in its lowermost position after it has been tripped.

15. In an animal trap, a cage, an entrance chamber, a passage connecting the cage and chamber, a pivoted gate for the passage, a tripping arm in the passage and provided with a member with which the gate engages, and a tilting platform in the entrance chamber and provided with an arm engaging the tripping arm.

In testimony whereof I have signed my name to this specification in the presence of two subscribing witnesses.

JAMES MOSLEY KELLOGG.

Witnesses:
 Geo. H. Neillson,
 M. J. Plumb.